2,700,611

MAKING COMPOSITIONS CONTAINING VIABLE RUMEN ORGANISMS

George A. Jeffreys, Salem, Va.

No Drawing. Application March 13, 1951,
Serial No. 215,375

5 Claims. (Cl. 99—2)

This invention relates to new and improved compositions which contain viable rumen organisms in desiccated form.

It is well known that there is a great variety of bacterial, protozoan and fungus organisms present in the rumen which play an essential role in ruminant digestion. Some studies have shown, for example, that as much as 48% of the cellulose fiber present in the feed is digested by the action of enzymes produced by rumen organisms. These organisms also produce many important nutritional factors, such as digestive enzymes and vitamins, including vitamin $B_{12}$ and other members of the vitamin B complex.

The organisms essential for cellulose digestion are not present in ruminant young at birth and must be acquired subsequently by ingestion. Normally, this is a more or less "hit or miss" procedure with the young apparently acquiring the requisite microorganisms by suckling the mother. As a result, establishment of the rumen organisms in the young rumen is relatively slow. Since cellulose feeds, such as hay, cannot be digested without the aid of the rumen organisms, the young ruminant must be fed milk for a considerable period of time, thus reducing the quantity available for marketing. Feeding solid foods to young ruminants before adequate rumen microorganisms are established results in loose stools and scours.

The object of this invention is to provide compositions containing desiccated rumen organisms which preserve the organisms in viable state indefinitely for use as a therapeutic and dietary supplement in the feeding of livestock.

Another object is to provide desiccated, viable rumen compositions which include viable anaerobic bacterial strains and which do not require packaging or storage out of contact with air in order to maintain the viability of the anaerobic bacteria.

Still another object is to provide desiccated, viable rumen culture compositions which, when fed to young ruminants, such as calves, serve to seed the rumen with the proper organisms.

Another object is to provide desiccated, viable rumen culture compositions which may be employed therapeutically to treat defective rumen conditions and to supplement the normal functioning of the rumen whenever desirable.

Still another object is to provide viable rumen culture compositions which are highly beneficial as a dietary supplement for livestock inasmuch as they tone the rumen and provide significant amounts of digestive enzymes and vitamins.

Another object is to provide processes for preparing said desiccated viable rumen culture compositions.

Other objects and advantages will become apparent to those skilled in the art from the following detailed description of my invention.

It will be understood that the term "rumen organisms" as employed in this specification and in the claims, is a collective term referring to a mixture of microorganisms normally present in the animal rumen. The rumen bacteria have thus far been classified to a large extent only according to general types. A great deal of work still remains to be done to determine the genera and species of the many different organisms.

The animal rumen operates under anaerobic conditions and the microorganisms indigenous to the rumen must, therefore, be anaerobic in character, namely facultative or obligate anaerobes. However, the obligate anaerobes, which comprise several important strains of the rumen microflora, except for those which can produce resistant spores, cannot be kept viable in contact with air. Thus, to prepare a rumen culture containing substantially all of the important strains of rumen microorganisms, including the obligate anaerobic types, it is necessary to culture the organism anaerobically. To preserve the incubated cultures in viable condition, the anaerobic organisms, even in desiccated form, must be maintained out of contact with air. This could be accomplished by keeping the desiccated culture in sealed containers. However, this is not feasible where the culture is to be put to such practical uses as stock feeding, since within a very short time after opening the container, the anaerobic strains in the culture would be destroyed.

Broadly speaking, my process for preparing compositions containing preserved rumen organisms, including obligate anaerobic strains, comprises admixing a liquid suspension of rumen organisms obtained from the rumen of a healthy ruminant with a sugar, and then with a dry, solid carrier, such as fibrous cellulose, sterile soil or dry milk solids to form a granular composition. The mixing of these various components is carried out in the absence of air, preferably in the presence of an inert gas such as nitrogen or $CO_2$. The resulting granules are dried under vacuum and then treated in the presence of an inert gas with a coating compound which, when dried, seals the interior portion of the granules from contact with air.

The rumen organisms should be taken from healthy, disease tested and properly supervised stock, as for example, from a typical ruminant such as a steer, sheep, goat, etc. A sample of the rumen contents may be withdrawn under aseptic conditions by means of a sterilized stomach pump or the rumen contents of a slaughtered animal may be ground in sterile water under inert gas and strained. The liquid rumen inoculum thus obtained is preferably admixed with a sterile aqueous glucose solution in any proportion, as for example, with an equal volume of a 1 to 5% glucose solution. This is not essential but the glucose exerts a desirable preservative action. The liquid contents of the rumen can be pumped directly into a flask containing the glucose solution as they are withdrawn from the animal. To ensure anaerobic conditions the glucose solution should be deaerated and covered with an inert gas, such as carbon dioxide or nitrogen prior to use.

The ground and strained rumen contents or the liquid pumped out of the rumen may be employed directly to form the dry granular rumen compositions of my invention, if desired. However, I prefer to proliferate the rumen organisms by culturing since this provides a more concentrated and larger available supply of rumen organisms.

To proliferate the organisms the rumen inoculum obtained as aforedescribed, with or without the added glucose, is introduced into a sterile liquid culture medium in which it is incubated under anaerobic conditions. The culture medium may be any suitable broth containing the elements essential for growth, such as soluble carbohydrates, a source of available nitrogen and the necessary minerals. As an example, I have found a broth comprising the following constituents to be an excellent growth medium: 1% glucose, 0.5% tryptone, 0.5% beef extract, 0.5% peptone, 0.5% yeast extract, 0.5% potassium hydrogen phosphate and 0.1% calcium carbonate. If desired, a compound which combines readily with free oxygen, as for example, a small amount of sodium thioglycolate, may be included to remove such traces of this gas as might still be present. To ensure proper growth of the rumen organisms the pH of the culture medium should be adjusted within a range of about 6.8 to about 7.2 before sterilization. Sterilization of the broth may be accomplished in any desired fashion, as for example, heating at 252° C. for 15 minutes. A hay or hay and bran infusion sterilized by filtration will improve the culture medium, as for example, a 5% infusion added to the sterile broth in amounts comprising about 10 to 50% by volume.

Any suitable dilution of the rumen inoculum in the culture medium may be used, as for example, a dilution of 1:100, 1:1000, 1:1,000,000, etc. The technique of serial dilution may be employed if desired in order to eliminate any possibility of contamination which might be present in the original rumen sample, and to accentuate the predominant bacterial strains. As an additional precaution against the possible presence of undesirable extraneous organisms, samples of both the original inoculum and of the incubated cultures may be examined microscopically according to any acceptable technique. As a still further check, test animals such as guinea pigs may be inoculated to check the presence of contaminating disease organisms. However, there is substantially no danger of contamination with pathogenic organisms if the ruminant from which the rumen inoculum is taken has been carefully reared and periodically tested.

The inoculated culture medium is then incubated by any of the well known anaerobic methods for a period of about 12 to 72 hours at temperatures which should not exceed about 40° C. and preferably at a temperature of about 37° C.

The aqueous suspension of rumen organisms, either in cultured or uncultured form, is then combined with a sugar, preferably in the form of a concentrated syrup, as for example, corn syrup or molasses. Solid sugars may also be used and dissolved in the rumen liquid. Although I prefer to use glucose, substantially any suitable sugar gives good results, including such sugars as sucrose, fructose and lactose. The sugar is essential chiefly for its preservative properties and ensures viability of the desiccated organisms indefinitely. The quantity of sugar employed may vary over a very wide range, it being necessary only to incorporate sufficient to adequately preserve the organisms. In general, I prefer to use about 0.2 to about 2 parts of the sugar to 1 part of the liquid rumen culture, although more or less of the sugar may be used.

A more concentrated form of rumen organism suspension can be made either by filtering the cultured broth or the strained rumen liquid, or by centrifuging at high speed. This separates all the bacteria from most of the liquid, along with a small amount of residue in the form of a paste. The highly viscous rumen concentrate is preferably diluted with sterile water to reduce its consistency and thus facilitate absorption by the dry carrier. In general, about an equal volume of water is sufficient for this purpose. Since, broadly speaking, the rumen liquid is concentrated to a fraction of the original volume, the total amount of water is greatly reduced. The rumen concentrate is processed in the same manner as the unconcentrated rumen suspension. Because of the relatively small proportion of water in the rumen concentrate, the sugar is preferably added in the form of a concentrated syrup. Use of such rumen concentrates is particularly advantageous when it is desired to make granular compositions having particularly high bacterial counts per unit weight. The small amounts of water incorporated into the mixture when such concentrates are employed, make quick freezing and drying at freezing temperatures feasible.

The liquid rumen organism-sugar mixture is absorbed on a dry, solid vehicle such as comminuted cellulose fiber, sterile soil or dried milk. Although any one of the aforementioned vehicles give satisfactory results when employed alone, I prefer to use the cellulose fiber either as the sole carrier or in conjunction with sterile soil or dried milk solids, preferably the latter. The cellulose fibers are especially adapted to my purpose since they absorb the liquid rumen organism-sugar mixture into the many interstices and intercellular spaces, thus holding it tenaciously.

Although dried milk serves as a good carrier medium without the additional use of cellulose fibers, I prefer to employ it in conjunction with the aforementioned carrier, since the milk solids exert an advantageous preservative and sealing action by acting as a covering for the sugar-organism mixture absorbed into the pores and interstices of the cellulose vehicle. The use of dried milk solids is also advantageous inasmuch as it provides excellent nutritional values for livestock. The lactose present enhances the perservative action of the sugar already added for the purpose.

Sterile soil can be used as a substitute for the milk solids and, in fact, gives satisfactory results when employed as the sole carrier. However, it is not quite as good an absorbing agent for the sugar-organism mixture as the cellulose, and is preferably used in conjunction with the latter.

The various mixing operations, namely, the mixing of the broth culture or the strained rumen contents with the sugar and then with the dry carrier should be accomplished out of contact with air, preferably in the presence of an inert gas such as carbon dioxide or nitrogen.

The soil and the bulk of the milk solids are preferably added after the cellulose. This order of addition is not essential but is desirable, since it avoids mixing difficulties. Absorption of the liquid sugar-rumen organism mixture is more readily accomplished by the cellulose before the other solids are incorporated. However, when milk solids are employed a small proportion may be advantageously added to the aqueous rumen organism-sugar mixture before absorption by the cellulose. The milk solids should be added to the liquid only in such amounts as to permit retention of sufficient fluidity for easy absorption by the cellulose. I have found that the small amount of milk solids which strike into the cellulose fibers in intimate association with the bacteria enhance preservation of the organisms.

The amount of dry carrier used may vary broadly. It is preferable to use sufficient to absorb the liquid rumen organism-sugar, or liquid rumen organism-sugar-milk mixture, and to form a granular mass. The larger the proportion of dry vehicle used, the less is the unit drying requirement. The amount of carrier may also be varied depending upon the desired concentration of rumen organisms. The amount will also vary depending upon the amount of water incorporated. Rumen organism concentrates will, for example, require less absorptive vehicle than the unconcentrated liquid. In general I have found that the dry carrier comprises about half to a major proportion of the total composition after drying. When the carrier comprises a mixture of cellulose with milk solids or soil, the two components may be employed in any relative proportions. For highly absorptive qualities the cellulose is preferably in major proportion relative to the milk or soil. However, if it is desired to augment the nutritional properties of the composition, the proportion of milk solids may be increased so that it comprises a major proportion of the solid carrier with the cellulose present in minor proportions, as for example, two parts of milk solids to one part of the cellulose. I have found that best results are obtained when the milk solids comprise about 10% and preferably more of the cellulose fiber.

The pH of the granular mixture should be within a range of about pH 6.8 to 7.2. If necessary, it may be adjusted with a suitable agent, as for example, calcium carbonate.

Any suitable dry cellulose fiber may be used, such as ground beet pulp, citrus pulp, beanstalks, grasses, cotton, etc. with appropriate adjustment of pH if the particular fibrous material is too acidic or too alkaline. Synthetic fibrous cellulose derivatives, such as methyl cellulose, may also be used and it will be understood that the term cellulose as employed in this specification and in the claims embraces such fibrous synthetic cellulose derivatives.

The granular mixture is dried, preferably to a moisture content of about 6% or less under vacuum, as for example, a vacuum of about 27 to 29½ inches or more, at a temperature preferably less than 25° C. and which should not exceed about 40° C. After drying, an inert gas, such as carbon dioxide or nitrogen, is admitted and fills the pores and interstices in the granules. The mixture employing the rumen liquid concentrate can be quickly frozen by any quick freeze method and then desiccated under high vacuum.

The granules are then coated under the atmosphere of inert gas with a compound which seals the interior from contact with air and which also entraps the inert gas within the granule pores and interstices. The coating may be any suitable composition which sets to form a substantially impervious layer on the surface of the individual granules, as for example, casein, gelatine, sugar and the like, applied in concentrated form in an aqueous vehicle. The more concentrated compositions produce tougher coating films and also, by introducing a minimum of water, reduce subsequent drying requirements. By way of example, I have found about 20% concentrations of casein or gelatine and about 70 to 80% sugar solutions to give excellent results. Waxes, such as beeswax, are also satisfactory for my purpose and may be applied in molten condition or in solution in a suitable organic solvent such as ether or acetone. The sealing composition should, of course, be non-toxic.

The sealing composition may be applied in any desired fashion, as by spraying. A relatively small amount of the coating composition, as for example, about 5%, is generally sufficient to accomplish the desired sealing, although the quantities used may be varied, as desired. Where the compound is applied in an aqueous vehicle, it is advantageous to employ as little as is compatible with good results in order to minimize the amount of drying needed.

The granules coated with an aqueous composition are then dried to a moisture content of about 6% or less at a temperature which should not exceed about 40° C. If the granules prior to coating have been dried to a moisture content of about 4% or less, a subsequent drying operation may not be required. It is not necessary at this stage to keep the granules out of contact with air and, in fact, the drying may be accomplished by placing the granules on shelf driers and subjecting them to currents of warm air. If a molten wax coating is used, the wax solidifies upon cooling, and drying is not necessary. If the wax is applied in solution in an organic solvent, it is advisable to apply gentle heat to volatilize the solvent.

Where milk solids have been employed in conjunction with cellulose and added subsequently to absorption by the fiber of the liquid sugar-rumen organism mixture, the milk solids themselves provide a coating, not only on the surface of the individual granules but also internally around the fibers, including the cellular pores and interstices containing the bulk of the organisms, which effectively seals the organisms from contact with air. This sealing action is even more effective where a portion of the milk solids has been incorporated into the liquid containing the organisms prior to absorption on the fibrous carrier with the bulk added subsequently. Apparently after drying the milk solids added to the liquid forms a protective film around the organisms. It is, therefore, not essential to treat granules having a cellulose base with an additional sealing coating if milk solids have been incorporated into the mixture. However, such an additional coating may be employed if desired and possesses the advantage of entrapping within the granules an atmosphere of inert gas if applied as aforedescribed after vacuum drying in the presence of a gas, such as carbon dioxide or nitrogen.

The following example is given to illustrate a typical embodiment of my invention, but it will be understood that it is in no way limiting.

*Example*

100 parts by weight of strained, uncultured liquid obtained from an animal rumen or liquid rumen culture is admixed with about 10 parts of powdered milk in an atmosphere of inert gas.

About 20 to 150 parts by weight of glucose (in a solution of about 60° to 70° Brix) is added and thoroughly mixed.

This liquid is added to about 200 to 300 parts of a fibrous cellulose carrier and the pH adjusted if necessary to about 6.8 to 7.2. The mixture is agitated in an atmosphere of inert gas until the liquid is absorbed and the mix becomes granular in texture.

About 10 to 100 parts of powdered milk is then incorporated with further agitation. If the mixture appears too dry and powdery more of the rumen liquid may be added to provide a moist, granular texture.

The resulting granules are then dried under vacuum at a temperature which should not exceed about 40° C. An inert gas is admitted and then the granules are sprayed with a coating composition such as casein, sugar or gelatine in an aqueous vehicle or with a wax, either molten or in solution.

The coated granules are then dried if necessary at a temperature not exceeding about 40° C.

The resulting granules may be packaged in any convenient fashion without requiring special precautions for keeping them out of contact with air. The substantially impervious coating ensures continued viability of the anaerobic bacterial strains indefinitely. Viability is even further enhanced by internal atmosphere of inert gas entrapped within the pores and interstices of the granule. Test cultures made from granules after about 15 months show a high degree of viability of the typical microorganisms normally present in the animal rumen, including the obligate anaerobic strains.

The coated granules which may be fed to livestock either per se or in admixture with other feed, in addition to viable rumen organisms, contain substantial amounts of digestive enzymes and vitamins, especially the B complex vitamins, including significant quantities of vitamin $B_{12}$, which are important nutritional factors in livestock feeding.

The granules, which are particularly adapted for inclusion in the diet of very young ruminants, such as calves, provide a controlled and scientific means for seeding the young rumen with the normal and essential microorganisms. The granules may be fed to calves the first day after birth and become established within a few days. As a result, solid foods, such as hay and grain, may be included in the diet and milk discontinued considerably before this is normally possible for calves which acquire the requisite rumen organisms through ordinary environmental channels. In addition to the large saving of milk for marketing, early establishment of the typical rumen organisms substantially eliminates the frequent digestive difficulties which result in poor stools and scours.

The rumen compositions may also be employed therapeutically for ruminants of any age where rumen digestion has for some reason become impaired, by ensuring a supply of and reestablishment of the typical rumen organisms. They have proven particularly valuable in treating acetonemia or ketosis, a condition in which the cow is unable to maintain a normal level of blood sugar or glycogen. The preserved rumen cultures of my invention when fed to the cow, introduce vigorous strains of the requisite digestive microorganisms into the rumen, together with important digestive enzymes and vitamins. This results in marked stimulation of rumen activity with more rapid digestion of cellulose and starches to produce the needed glucose. Even in the case of adult, healthy ruminants, the preserved rumen cultures exert a desirable stimulating and toning effect. Furthermore, because of the presence of substantial amounts of important dietary factors, such as enzymes and vitamins, the rumen compositions provide highly advantageous supplements to the diets of any livestock, including non-ruminant animals such as pigs, minks, foxes, dogs and cats.

Although this invention has been described with reference to illustrative embodiments thereof, it will be apparent to those skilled in the art that the principles of the invention may be embodied in other forms but within the scope of the invention and of the appended claims.

Having thus described my invention, I claim:

1. A process for making dry granular compositions containing desiccated viable rumen organisms for livestock feeding which comprises admixing an aqueous suspension of rumen organisms with sugar, absorbing the liquid mixture on a solid carrier selected from the group consisting of comminuted fibrous cellulose, milk solids and soil to form a granular mixture, said mixing operations being carried out in the absence of air, drying said granules under vacuum, introducing an inert gas whereby the pores and interstices within said granules are filled with said gas, and then coating said granules in the presence of the inert gas with a composition which forms a surface film substantially impervious to the atmosphere.

2. A process for making dry granular compositions containing desiccated viable rumen organisms for livestock feeding which comprises, admixing an aqueous suspension of rumen organisms with a concentrated solution of a sugar, absorbing said liquid mixture on comminuted fibrous cellulose to form a granular mixture, said mixing operations being carried out in the presence of an inert gas, drying said granules under vacuum, introducing an inert gas whereby the pores and interstices within said granules are filled with said gas, and then coating said granules in the presence of the inert gas with a composition which forms a surface film substantially impervious to the atmosphere.

3. A process for making dry granular compositions containing desiccated viable rumen organisms for livestock feeding which comprises, admixing an aqueous suspension of rumen organisms with a sugar, absorbing said liquid mixture on comminuted fibrous cellulose and then adding milk solids to form a granular mixture, said mixing operations being carried out in the presence of an inert gas, drying said granules under vacuum, introducing an inert gas whereby the pores and interstices within said granules are filled with said gas, and then coating said granules in the presence of the inert gas with a composition which forms a surface film substantially impervious to the atmosphere.

4. A process for making dry granular compositions containing desiccated viable rumen organisms for livestock feeding which comprises admixing an aqueous suspension of rumen organisms with glucose, absorbing said liquid mixture on comminuted fibrous cellulose and then adding milk solids to form a granular mixture, said comminuted fibrous cellulose and said milk solids comprising a solid carrier for said rumen organisms and glucose, said solid carrier comprising a major proportion of the total mixture after drying, said cellulose being present in major proportion and said milk solids being present in minor proportion, said mixing operations being carried out in the presence of an inert gas, drying said granules under vacuum, introducing an inert gas whereby the pores and interstices within said granules are filled with said gas, and then coating said granules in the presence of the inert gas with a composition which forms a surface film substantially impervious to the atmosphere.

5. A process for making dry granular compositions containing desiccated viable rumen organisms for livestock feeding which comprises, inoculating a suitable aqueous culture medium having a pH of about 6.8 to 7.2 with rumen organisms, anaerobically culturing said organisms at a temperature which does not exceed about 40° C., admixing said liquid culture with about 20 to 150 parts of glucose in the form of a concentrated syrup, absorbing said liquid mixture on about 200 to 300 parts of comminuted fibrous cellulose and then with about 20 to 100 parts of milk solids to form a granular mixture, said mixing operation being carried out in the presence of an inert gas, drying said granules under vacuum, introducing an inert gas whereby the pores and interstices within said granules are filled with said gas, then coating said granules in the presence of the inert gas with a composition which forms a surface film substantially impervious to the atmosphere.

References Cited in the file of this patent

UNITED STATES PATENTS 2,560,830  Turner ---------------- July 17, 1951